United States Patent [19]
Chou

[11] Patent Number: 5,468,373
[45] Date of Patent: Nov. 21, 1995

[54] MULTIPLE-EFFECT WATER TREATMENT APPARATUS

[76] Inventor: Wu-Chang Chou, c/o Hung Hsing Patent Service Center, P.O. Box 55-1670, Taipei, Taiwan

[21] Appl. No.: 243,378

[22] Filed: May 16, 1994

[51] Int. Cl.$^6$ ....................................... C02F 9/00
[52] U.S. Cl. .............. 210/94; 210/202; 210/223; 210/259; 210/264; 210/266; 210/283; 210/284
[58] Field of Search ............................ 210/94, 202, 223, 210/259, 266, 283, 284, 264

[56] References Cited

U.S. PATENT DOCUMENTS

| | | | |
|---|---|---|---|
| 4,501,661 | 2/1985 | Karasawa | 210/223 |
| 5,064,531 | 11/1991 | Wang et al. | 210/266 |
| 5,064,534 | 11/1991 | Busch et al. | 210/266 |

Primary Examiner—Ivars Cintins

[57] ABSTRACT

A water treatment apparatus includes a primary column having an iodine disinfection layer and an activated carbon layer juxtapositionally provided in the primary column for killing bacteria and for absorbing odors in a feed water, and a secondary column adjacent to and connected to the primary column and having an ion exchange layer, and a mineralizing layer juxtapositionally installed in the secondary column for alternatively removing ions from the water, or for adding minerals into the treated water for health reason as manipulated by a switching valve device having a first valve and a second valve which are simultaneously operated for selectively opening the first valve for directing the water to be mineralized but closing the second valve for interrupting the water into the ion exchange resins if only a mineralized water is required.

5 Claims, 4 Drawing Sheets

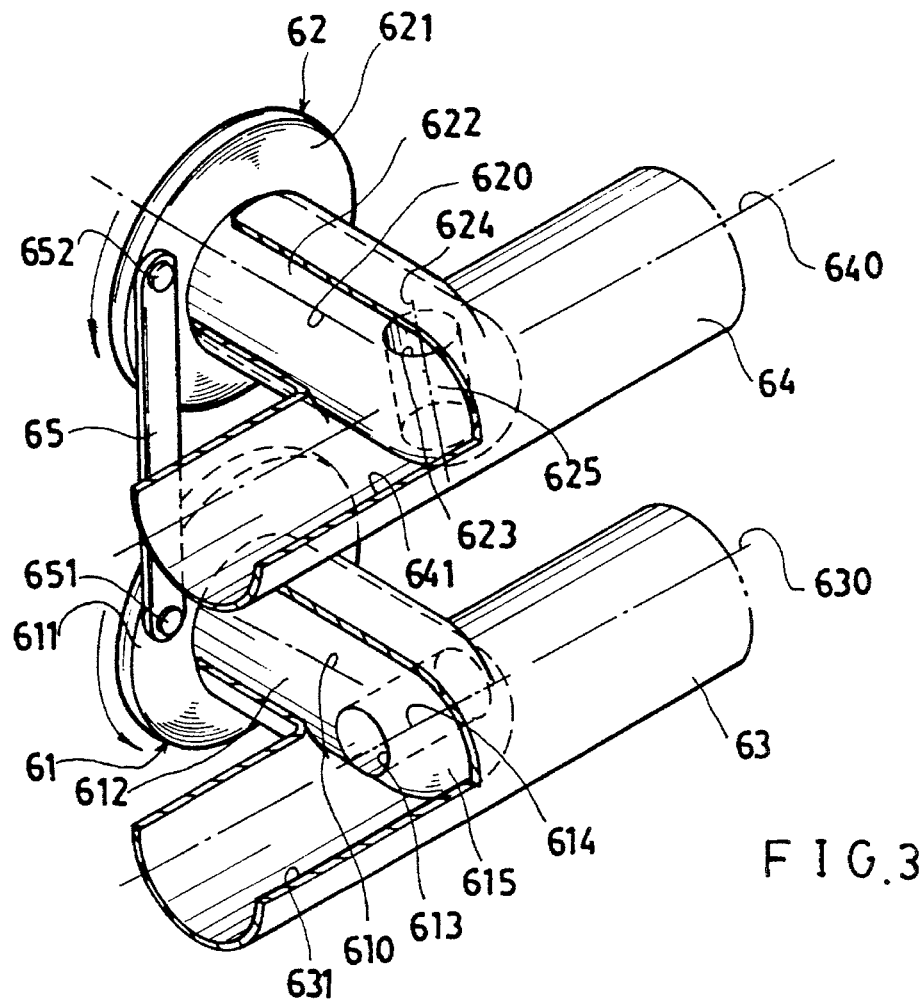
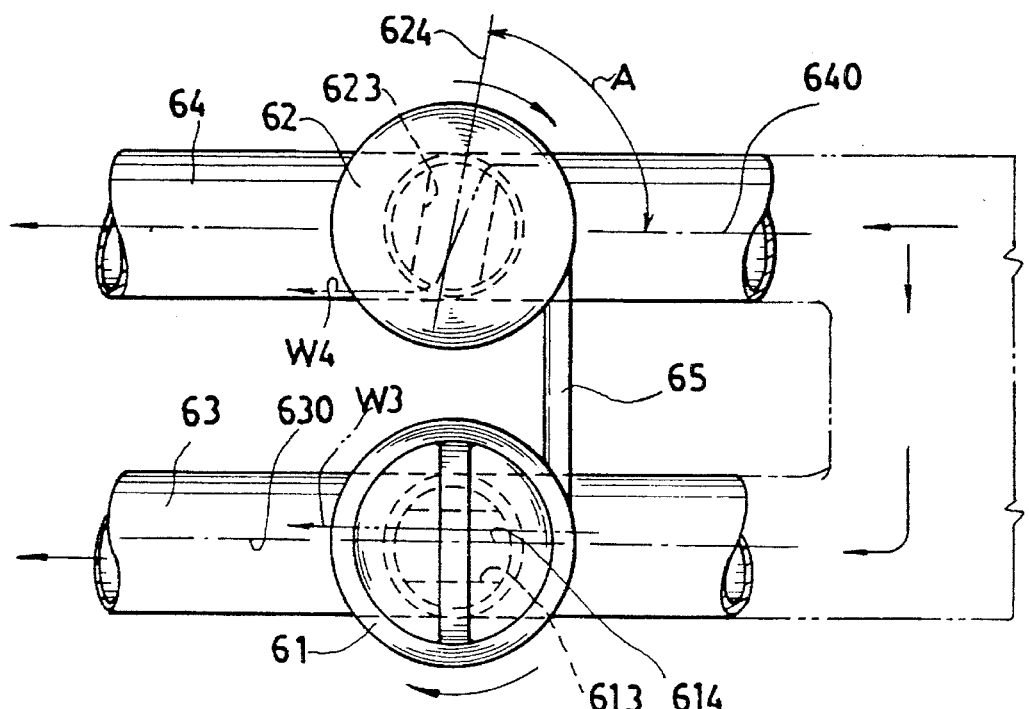
FIG.3
FIG.2

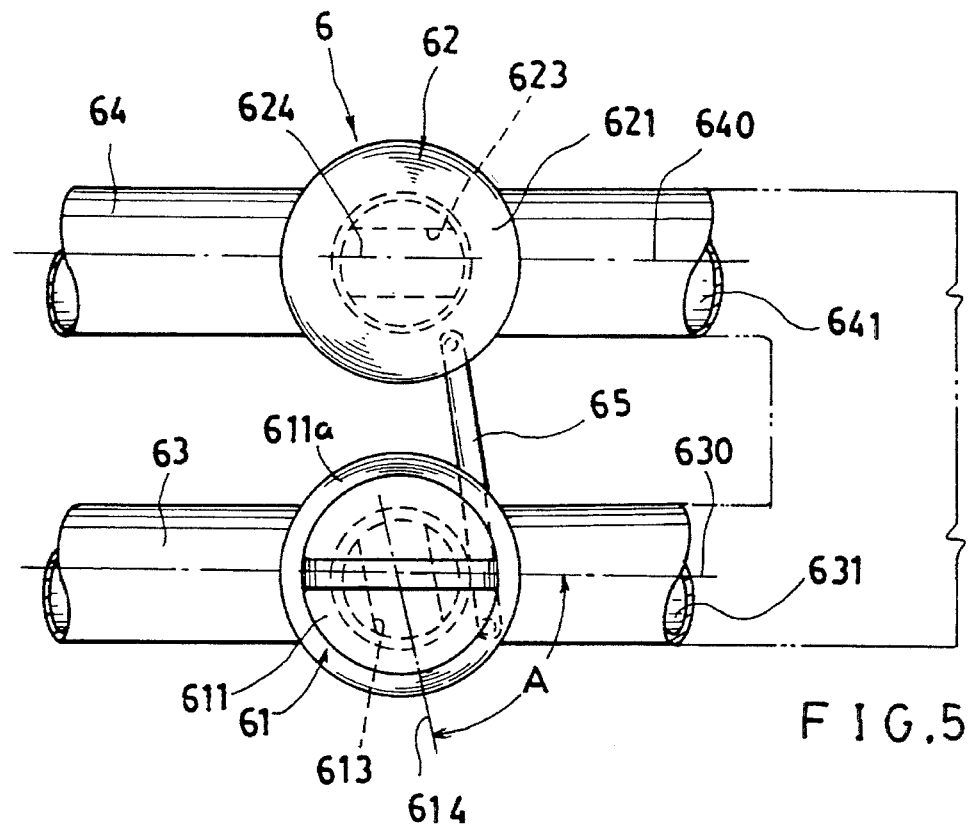
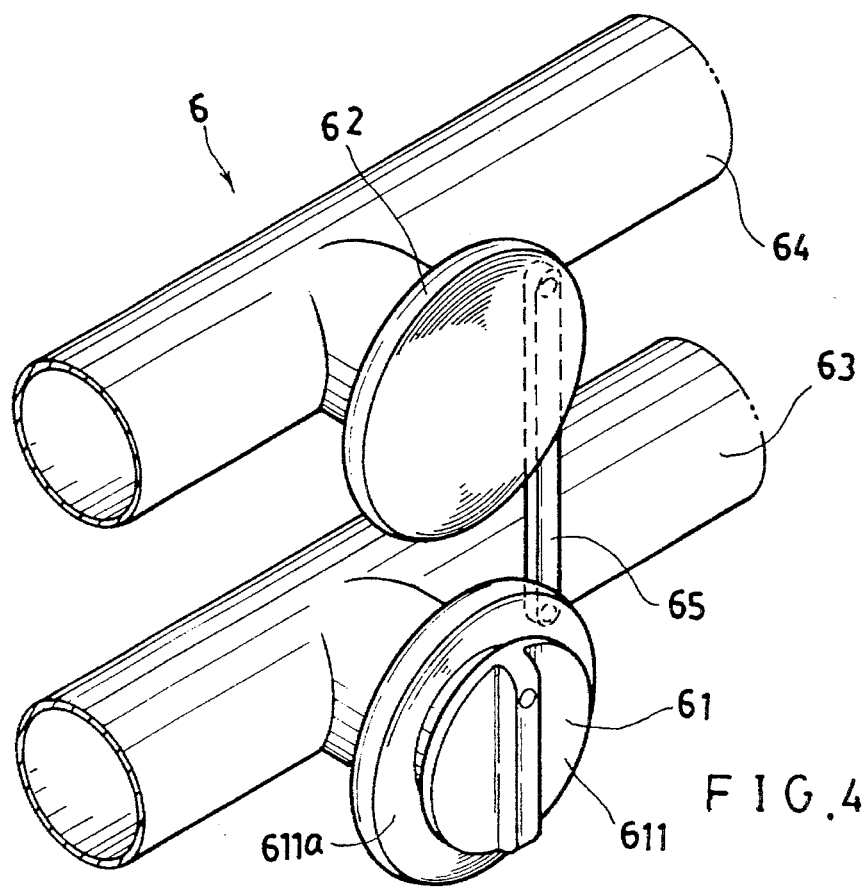
FIG. 5
FIG. 4

MULTIPLE-EFFECT WATER TREATMENT APPARATUS

BACKGROUND OF THE INVENTION

A conventional water treatment unit such as installed in a kitchen is provided to produce clean water by filtering and removing dirts, ions, odors, and bacteria carried in a feed water. Even though a cation and anion exchange resin or a reverse osmosis filter may effectively filter or remove the ions, some mineral ions such as calcium, magnesium, potassium and ferric ions, which are required by human body for health reason, are also removed by the conventional water treatment unit.

It is therefore necessary to provide a water treatment apparatus not only to filter off the dirts, but also to furnish the minerals beneficial to human health.

Besides, an aqueous drinking solution always contains flocculent groups of water molecules of larger number of water molecules, being difficult to be absorbed by human cells. It is desired to magnetize water in order to disperse the larger water-molecule groups to be smaller groups of water molecules, helpful for an absorption by human body for health reason.

SUMMARY OF THE INVENTION

The object of the present invention is to provide a water treatment apparatus including a primary column having an iodine disinfection layer and an activated carbon layer juxtapositionally provided in the primary column for killing bacteria and for absorbing odors in a feed water, and a secondary column adjacent to and connected to the primary column and having an ion exchange layer, and a mineralizing layer juxtapositionally installed in the secondary column for alternatively removing ions from the water, or for adding minerals into the treated water for health reason as manipulated by a switching valve device having a first valve and a second valve which are simultaneously operated for selectively opening the first valve for directing the water to be mineralized but closing the second valve for interrupting the water into the ion exchange resins if only a mineralized water is required.

Another object of the present invention is to provide a water treatment apparatus having a plurality of collar magnet disks juxtapositionally disposed around a water conduit to be cleaned for magnetizing water flowing through the magnet disks for dispersing water molecules from a larger group of water molecules to a small group of water molecules to be easily absorbed by human cells for enhancing human health.

BRIEF DESCRIPTION OF THE DRAWINGS

FIG. 2 is a front view illustration of a switching valve means of the present invention.

FIG. 3 is a rear perspective view of the switching valve means when viewed from a rear direction of FIG. 2.

FIG. 4 is a perspective view of the valve means of FIG. 2.

FIG. 5 shows another operation situation of the valve means in accordance with the present invention.

DETAILED DESCRIPTION

Figure 1:
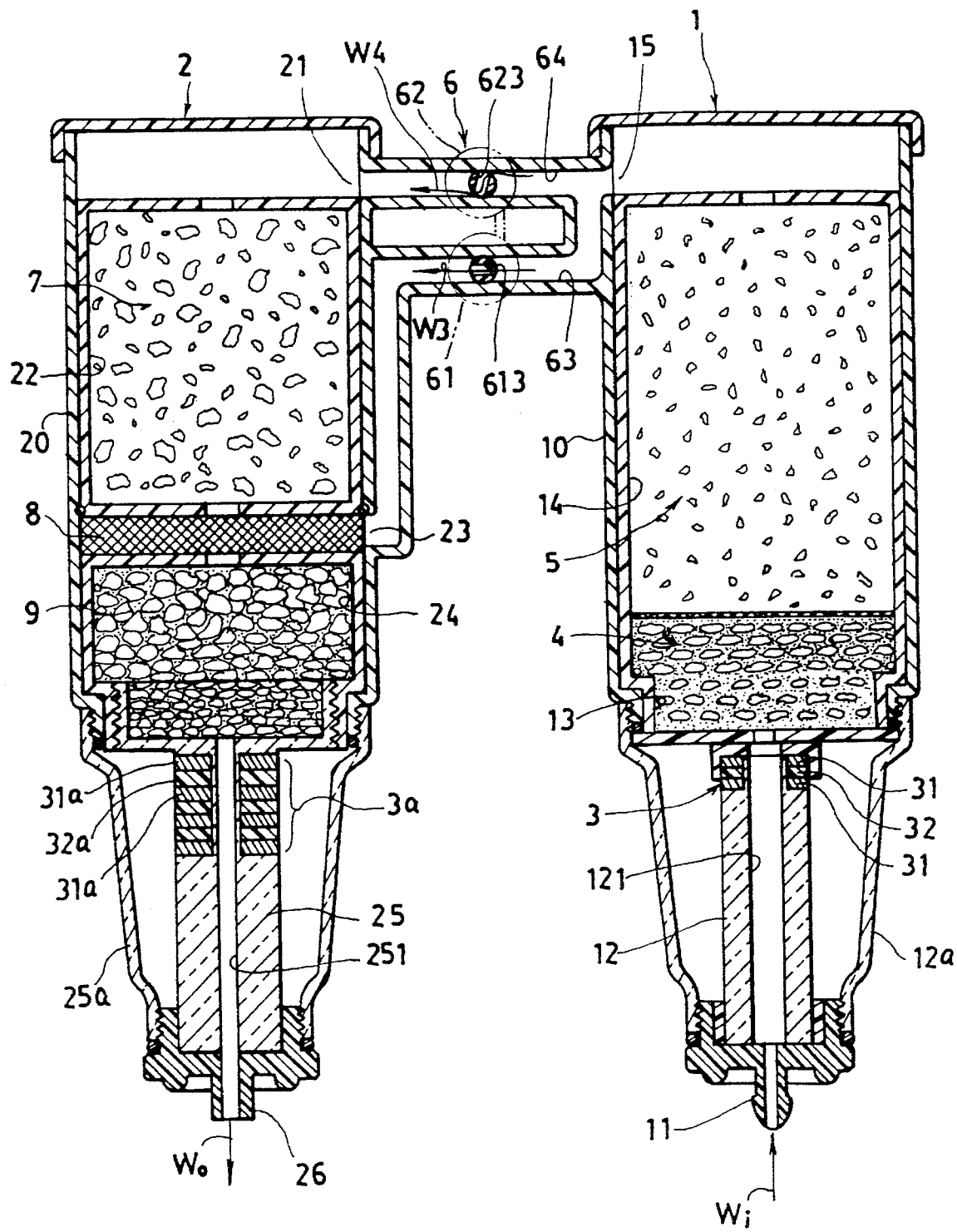
FIG. 1 is a sectional drawing showing a systematic arrangement of the present invention.

As shown in FIGS. 1–4, the present invention comprises: a primary treating column 1; a secondary treating column 2; a primary magnetizing means 3 and a secondary magnetizing means 3a respectively installed in the primary and secondary treating columns 1, 2; an iodine disinfection layer 4 provided in the primary column 1; an activated carbon layer 5 packed in the primary column 1; an ion exchange layer 7 fixed in the secondary column 2; a mineralizing layer 9 formed in the secondary column; and a switching valve means 6 having a first valve 61 provided in a first conduit 63 for communicating the primary column 1 with a screening filter 8 positioned in a middle portion of the secondary column 2 before entering the mineralizing layer 9, and a second valve 62 provided in a second conduit 64 for communicating the primary column 1 with the ion exchange layer 7.

The iodine disinfection layer 4 is provided with iodine compound for killing bacteria in the raw water.

The activated carbon layer 5 is provided with activated carbon for adsorbing odors or poisonous materials in the raw water to be treated by this invention.

The ion exchange layer 7 is provided with ion exchange resins such as a cation exchange resin which can replace cations in solution with hydrogen ions for removing the cations in the water.

The mineralizing layer 9 is provided with minerals including quartz rock and coral rock immersed in the water to be mineralized to dissolve some mineral ions, such as calcium, ferric, potassium, and magnesium ions which are required for human health, into the water.

The screening filter 8 is provided for filtering solids laden in the water stream as delivered by the conduit 63 connected between the primary column 1 and the secondary column 2, Although the layers 4, 5, 7, 9; the magnetizing means 3, 3a and the filter 8 are so arranged and positioned in the two columns 1, 2 as shown in FIG. 1, they may however be rearranged, relocated or modified to be other arrangements by those skilled in the art, which are not limited in this invention.

The primary treating column 1 includes: an inlet adapter 11 formed on a first end (or lower) portion of a first container 10 generally cylindrical shaped and preferably vertically erected for connecting an inlet (or feed) raw water supply Wi, a transparent tube 12 connected to the inlet adapter 11 for directing the inlet raw water supply Wi into an inlet water passage 121 formed in the transparent tube 12 from which a dirt accumulation or contamination on the transparent tube will be observed as becoming opaque or translucent or colored on the tube 12 serving as a pre-warning for maintenance and cleaning of the water treatment apparatus of this invention, an outer transparent cover 12a surrounding and protecting the transparent tube 12, a primary magnetizing means 3 having a plurality of first collar magnet disks 31 juxtapositionally disposed around the transparent tube 12, an iodine disinfection chamber 13 formed in a middle portion of the first container 10 following the primary magnetizing means 3 for packing the iodine disinfection layer 4 containing iodine disinfection compound in the iodine disinfection chamber 13, an adsorption chamber 14 formed in a middle portion of the first container 10 following the iodine disinfection chamber 13 for filling the activated carbon layer 5 containing activated carbon in the adsorption chamber 14, and an outlet port 15 formed on a second end (or upper end) portion of the first container 10 opposite to the inlet adapter 11 to be connected with the secondary treating column 2 by the flip-flop valve means 6, with every two neighboring magnet disks 31 of the primary magnetizing means 3 being partitioned by an insulative pad 32 made of non magnetic materials in between the two neighboring magnet disks 31.

The magnetic field in each magnet disk 31 of the primary magnetizing means 3 may be larger than 1000 gauss. The materials for making the magnet disk 31 or 31a of the magnetizing means 3 or 3a are not limited in this invention.

The secondary treating column 2 includes: an inlet port 21 communicating with the outlet port 15 of the primary treating column and formed on a first end (or upper end) portion of a second container 20 generally cylindrical shaped, a softening chamber 22 formed in the second container 20 communicating with the inlet port 21 for loading the ion exchange layer 7 containing ion exchange resins in the softening chamber 22, a screening filter 8 positioned in a middle portion 23 of the second container 20 between the softening chamber 22 and a mineralizing chamber 24 contiguous to (or below) the screening filter 8 and also communicating with the outlet port 15 of the primary treating column 1, the mineralizing chamber 24 packed with minerals of quartz rock and coral rock in the mineralizing chamber 24, a discharge tube 25 following the mineralizing chamber 24 having an outlet water passage 251 formed in the discharge tube 25 and an outer cover 25a surrounding and protecting the discharge tube 25 and having an outlet adapter 26 connected to the discharge tube 25 for outputting treated water Wo from the secondary treating column 2, and a secondary magnetizing means 3a having a plurality of second collar magnet disks 31a, each disk 31a having higher magnetic field such as being or more than 3000 gauss, juxtapositionally disposed around the discharge tube 25 having every two neighboring collar magnet disks 31a partitioned with an insulative pad 32a made of non magnetic materials between the two neighboring disks 31a, with the secondary treating column 2 communicating with the primary treating column 1 by means of a switching valve means 6.

The switching valve means 6 includes: a first conduit 63 connected between the outlet port 15 of the primary treating column 1 and the screening filter 8 of the secondary column 2, a first valve 61 rotatably mounted in the first conduit 63, a second conduit 64 connected between the outlet port 15 of the primary column 1 and the inlet port 21 of the secondary column 2, a second valve 62 rotatably mounted on the second conduit 64, and a linking rod 65 having a first pivot 651 pivotally connecting the first valve 61 to a first end of the rod 65 and a second pivot 652 pivotally connecting the second valve 62 to a second end of the rod 65, with the linking rod 65 pivotally connecting the first valve 61 and the second valve 62 for simultaneously maintaining an opened first valve 61 with respect to a closed or slightly opened second valve 62 and for simultaneously maintaining a closed or slightly opened first valve 61 with respect to an opened second valve 62 for selectively directing a water stream flow through one of the first conduit 63 and the second conduit 64.

The first valve 61 includes: a first valve stem 612 having a first driving wheel (or handle) 611 secured on an outer end of the first valve stem 612 and having a first plug 615 secured on an inner end of the first valve stem 612 and rotatably mounted in the first conduit 63 which includes a first water passage 631 longitudinally formed in the first conduit 63 and defining a first longitudinal axis 630 in the first water passage 631, the first valve stem 612 defining a first stem axis 610 generally perpendicular to the first longitudinal axis 630 of the first conduit 63, the first plug 615 having a first plug opening 613 formed through the first plug 615 and defining a first plug axis 614 longitudinally formed in a center of the first plug opening 613 and generally aligned with the first longitudinal axis 630 of the first conduit 63 when the first plug opening 613 is fully opened by opening the first valve 61, and a plurality of graduations 611a circumferentially disposed around the first driving wheel 611 for indicating an opening size of the first plug opening 613.

The second valve 62 includes: a second valve stem 622 having a second driving wheel (or handle) 621 pivotally connected to the first driving wheel 611 by the linking rod 65 and secured on an outer end of the second valve stem 622 and having a second plug 625 secured on an inner end of the second valve stem 622 and rotatably mounted in the second conduit 64 which includes a second water passage 641 longitudinally formed in the second conduit 64 and defining a second longitudinal axis 640 in the second water passage 641 parallel to the first longitudinal axis 630 of the first conduit 63, the second valve stem 622 defining a second stem axis 620 generally perpendicular to the second longitudinal axis 640 of the second conduit 64, the second plug 625 having a second plug opening 623 formed through the second plug 625 and defining a second plug axis 624 longitudinally formed in a center of the second plug opening 623 generally aligned with the second longitudinal axis 640 of the second conduit 64 when the second valve 62 is fully opened as shown in FIG. 5 and the second plug axis 624 operatively deviating an acute angle A, for instance 80 degrees (but not limited), from the second longitudinal axis 640 of the second conduit 64 for slightly opening the second plug opening 623 as shown in FIG. 2 and the second plug axis 624 operatively deviating the acute angle A from the first plug axis 614 of the first valve 61 when the first valve 61 is opened as shown in FIG. 2.

Figure 6:
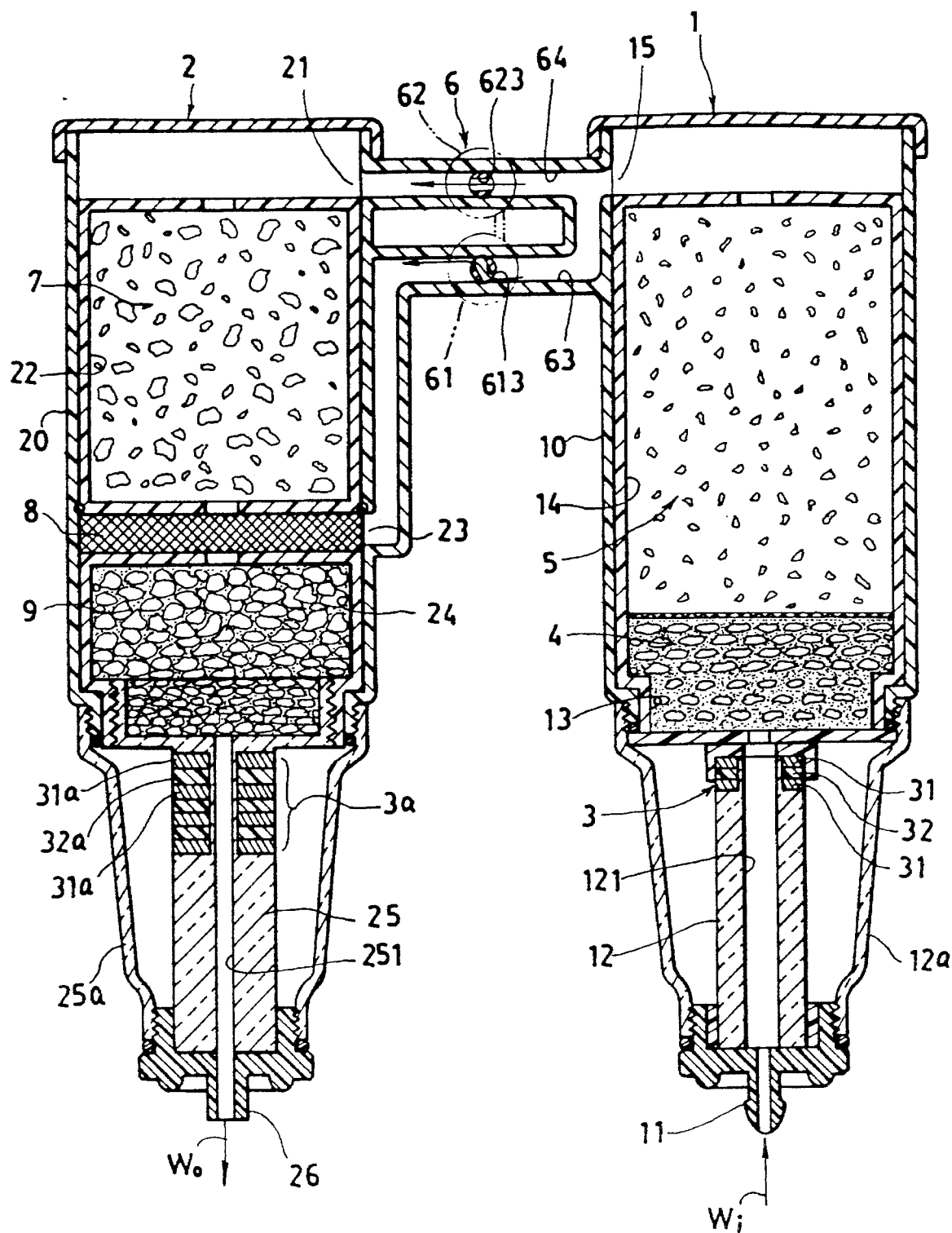
FIG. 6 is a sectional drawing of the present invention having the valve means as illustrated in FIG. 5.

Upon fully opening of the first valve 61 and slightly opening of the second valve 62 as shown in FIGS. 2 and 1, a main water streamflow W3 will flow from the primary column 1 towards the screening filter 8 in a middle portion of the secondary column 2 through the first conduit 63 to be directly mineralized in the mineralizing layer 9 without being ion exchanged; and only a subsidiary water streamflow W4 will flow through a small opening in the second plug opening 623 of the second valve 62 to direct primarily treated water from primary column 1 into the ion exchange layer 7 in an upper (or first end) portion of the secondary column 2 for replacing the cations (or anions) in the water with hydrogen (or hydroxide) ions. Therefore, the ion exchange resin in the softening chamber 22 can prolong its service life since merely a subsidiary streamflow W4 is fed thereinto. However, if the water from the primary column 1 still contains a great amount of cations in the water, the water streamflow should be mainly directed into the softening chamber 22 through the second conduit 64 by fully opening the second valve 62 as shown in FIGS. 5, 6, but closing or partially opening the first valve 61 to enhance the ion exchange operation for removing cations in the chamber 22 of the secondary column 2. The above-mentioned subsidiary streamflow W4 may always keep a streamflow through the conduit 64 to thereby prevent a "water-hammar" by partially opening the valve 62, and the small flow W4 may always "flush" the ion exchange resin in softening chamber 22 to prevent accumulation of dirts on the resin.

By the selective operation of the switching valve means 6 of the present invention, a treated water with desired ionic concentrations can be satisfactorily obtained since the first valve 61 and the second valve 62 can be simultaneously operated to alternatively selectively direct the water streamflow either through the first conduit 63 or through the second conduit 64. Therefore, the present invention can be properly used in any area fed with raw water of different hardness or ionic concentrations.

The present invention may be modified without departing from the spirit and scope as claimed in this invention.

I claim:

1. A water treatment apparatus comprising:

a primary treating column (1) including an inlet water passage (121) for directing a raw water supply through said inlet water passage (121) of said primary column, a primary magnetizing means (3) surrounding the inlet water passage (121) for primarily magnetizing the raw water supply fed into said primary column, an iodine disinfection layer (4) containing iodine compound packed in said primary column for killing bacteria in the raw water supply, and an activated carbon layer (5) containing activated carbon in said primary column (1) and downstream connected to said iodine disinfection layer (4) for adsorbing odors and poisonous materials in the raw water supply;

a secondary treating column (2) downstream connected to and communicating with said primary treating column (1) by a switching valve means (6) and having an ion exchange layer (7) containing ion exchange resins packed in a first portion of said secondary column (2) for removing ions in the water, a screening filter (8) retained in a middle portion (23) of said secondary column (1), a mineralizing layer (9) containing quartz rock and coral rock for dissolving mineral ions from said rocks into the water and packed in a second portion in said secondary column (2) and partitioned from said ion exchange layer (7) with said screening filter (8), and a secondary magnetizing means (3a) disposed around a discharge tube (25) connected to said secondary column (2) for magnetizing treated water from said secondary column following said mineralizing layer (9); and said switching valve means (6) including: a first conduit (63) connected between the primary treating column (1) and the middle and second portions of the secondary column (2), a first valve (61) rotatably mounted in the first conduit (63), a second conduit (64) connected between the primary column (1) and the first portion of the secondary column (2), a second valve (62) rotatably mounted on the second conduit (64), and a linking rod (65) pivotally connecting the first valve (61) and the second valve (62) for simultaneously opening the first valve (61) and closing said second valve (62) for directing water from said primary column (1) into said screening filter (8) and said mineralizing layer (9) in said secondary column (2) for eliminating an ion exchange operation in said first portion of said secondary column and for simultaneously closing said first valve (61) and opening said second valve (62) for directing water into said ion exchange layer (7) in said secondary column (2) for an ion exchange therein.

2. A water treatment apparatus according to claim 1, wherein said primary treating column (1) includes: an inlet adapter (11) formed on a first end portion of a first container (10) generally cylindrical shaped for connecting the raw water supply, a transparent tube (12) connected to the inlet adapter (11) for directing the raw water supply (Wi) into said inlet water passage (121) formed in the transparent tube (12) for checking a poor cleaning of the water treatment apparatus when the transparent tube becomes opaque as accumulated with dirt thereon, an outer transparent cover (12a) surrounding the transparent tube (12), a primary magnetizing means (3) having a plurality of first collar magnet disks (31) disposed around said transparent tube (12), an iodine disinfection chamber (13) formed in a middle portion of the first container (10) and downstream connected to the primary magnetizing means (3) for packing the iodine disinfection layer (4) containing iodine disinfection compound in the iodine disinfection chamber (13), an adsorption chamber (14) formed in a middle portion of the first container (10) and downstream connected to the iodine disinfection chamber (13) for filling the activated carbon layer (5) containing activated carbon in the adsorption chamber (14), and an outlet port (15) formed on a second end portion of the first container (10) opposite to the inlet adapter (11) to be connected with the secondary treating column (2) by the switching valve means (6), with every two neighboring magnet disks (31) of the primary magnetizing means (3) being partitioned by an insulative pad (32) made of non magnetic materials in between the two neighboring magnet disks (31).

3. A water treatment apparatus according to claim 2, wherein said secondary treating column (2) includes: an inlet port (21) communicating with the outlet port (15) of the primary treating column and formed on a first end portion of a second container (20) generally cylindrical shaped, a softening chamber (22) formed in the second container (20) communicating with the inlet port (21) for packing the ion exchange layer (7) containing ion exchange resins in the softening chamber (22), a screening filter (8) positioned in a middle portion (23) of the second container (20) between the softening chamber (22) and a mineralizing chamber (24) contiguous to the screening filter (8) and communicating with the outlet port (15) of the primary treating column (1), a discharge tube (25) downstream connected to the mineralizing chamber (24) having an outlet water passage (251) formed in the discharge tube (25) and an outer cover (25a) surrounding the discharge tube (25) and having an outlet adapter (26) connected to the discharge tube (25) for outputing treated water (Wo) from the secondary treating column (2), and a secondary magnetizing means (3a) having a plurality of second collar magnet disks (31a) disposed around the discharge tube (25) having every two neighboring collar magnet disks (31a) partitioned with an insulative pad (32a) made of non magnetic materials between every two neighboring disks (31a), with the secondary treating column (2) communicating with the primary treating column (1) by means of said switching valve means (6).

4. A water treatment apparatus according to claim 3, wherein said switching valve means (6) includes: a first conduit (63) connected between the outlet port (15) of the primary treating column (1) and the screening filter (8) of the secondary column (2), a first valve (61) rotatably mounted in the first conduit (63), a second conduit (64) connected between the outlet port (15) of the primary column (1) and the inlet port (21) of the secondary column (2), a second valve (62) rotatably mounted on the second conduit (64), and a linking rod (65) having a first pivot (651) pivotally connecting the first valve (61) to a first end of the rod (65) and a second pivot (652) pivotally connecting the second valve (62) to a second end of the rod (65), with the linking rod (65) pivotally connecting the first valve (61) and the second valve (62) for simultaneously maintaining an opened first valve (61) with respect to a closed or slightly opened second valve (62) and for simultaneously maintaining a closed or slightly opened first valve (61) with respect to an opened second valve (62) for selectively directing a water stream flow through one of the first conduit (63) and the second conduit (64);

said first valve (61) including: a first valve stem (612) having a first driving wheel (611) secured on an outer end of the first valve stem (612) and having a first plug (615) secured on an inner end of the first valve stem (612) and rotatably mounted in the first conduit (63) which includes a first water passage (631) longitudinally formed in the first conduit (63) and defining a first longitudinal axis (630) in the first water passage (631), the first valve stem (612) defining a first stem axis (610) generally perpendicular to the first longitudinal axis (630) of the first conduit (63), the first plug (615) having a first plug opening (613) formed through the first plug (615) and defining a first plug axis (614) longitudinally formed in a center of the first plug opening (613) and generally aligned with the first longitudinal axis (630) of the first conduit (63) when the first plug opening (613) is fully opened by opening the first valve (61), and a plurality of graduations (611a) circumferentially disposed around the first driving wheel (611) for indicating an opening size of the first plug opening (613);

said second valve (62) including: a second valve stem (622) having a second driving wheel (621) pivotally connected to the first driving wheel (611) by the linking rod (65) and secured on an outer end of the second valve stem (622) and having a second plug (625) secured on an inner end of the second valve stem (622) and rotatably mounted in the second conduit (64) which includes a second water passage (641) longitudinally formed in the second conduit (64) and defining a second longitudinal axis (640) in the second water passage (641) parallel to the first longitudinal axis (630) of the first conduit (63), the second valve stem (622) defining a second stem axis (620) generally perpendicular to the second longitudinal axis (640) of the second conduit (64), the second plug (625) having a second plug opening (623) formed through the second plug (625) and defining a second plug axis (624) longitudinally formed in a center of the second plug opening (623) generally aligned with the second longitudinal axis (640) of the second conduit (64) when the second valve (62) is fully opened and the second plug axis (624) operatively deviating an acute angle (A) from the second longitudinal axis (640) of the second conduit (64) for slightly opening the second plug opening (623) and the second plug axis (624) operatively deviating the acute angle (A) from the first plug axis (614) of the first valve (61) when the first valve (61) is fully opened.

5. A water treatment apparatus according to claim 4, wherein said second plug axis (624) is operatively deviated an acute angle (A) from the second longitudinal axis (640) of the second conduit (64) for slightly opening the second plug opening (623) and the second plug axis (624) operatively deviating the acute angle (A) from the first plug axis (614) of the first valve (61) when the first valve (61) is fully opened, whereby upon fully opening of the first valve (61) and slightly opening of the second valve (62), a main water streamflow (W3) will flow from the primary column (1) towards the screening filter (8) in a middle portion of the secondary column (2) through the first conduit (63) to be directly mineralized in the mineralizing layer (9) without being ion exchanged; and a subsidiary water streamflow (W4) will flow through a small opening in the second plug opening (623) of the second valve (62) to direct primarily treated water from primary column (1) into the ion exchange layer (7) in the first end portion of the secondary column (2) for removing ions in the water.

\* \* \* \* \*